United States Patent [19]
Gagnon et al.

[11] Patent Number: 6,014,988
[45] Date of Patent: Jan. 18, 2000

[54] BEADED CENTER TUBE

[75] Inventors: Louis R. Gagnon, Weymouth; William P. Pope, Jr., Braintree; Richard H. Marson, Needham, all of Mass.

[73] Assignee: The Newcan Co., Inc., Holbrook, Mass.

[21] Appl. No.: 09/175,641

[22] Filed: Oct. 20, 1998

Related U.S. Application Data

[63] Continuation of application No. 09/038,415, Mar. 11, 1998.

[51] Int. Cl.$^7$ ........................................................ F16L 9/00
[52] U.S. Cl. ............................ 138/168; 138/173; 138/163; 138/121; 29/890.053; 29/890.14
[58] Field of Search ..................................... 138/168, 162, 138/166, 173, 121, 122, 177, 163, 167; 29/890.053, 890.14, 896.6, 896.62; 210/497.01

[56] References Cited

U.S. PATENT DOCUMENTS

| | | | |
|---|---|---|---|
| 683,386 | 9/1901 | Hobbs | 138/166 |
| 697,955 | 4/1902 | Thompson | 138/168 X |
| 1,075,153 | 10/1913 | Klotz | 29/890.14 |
| 1,571,412 | 2/1926 | Irvin | 138/168 X |
| 1,890,077 | 12/1932 | Elting | 138/168 X |
| 2,054,703 | 9/1936 | Little et al. | 138/166 X |
| 3,154,037 | 10/1964 | Mayrath | 138/168 X |
| 3,208,140 | 9/1965 | Mayrath | 138/168 X |
| 3,794,364 | 2/1974 | Williams | 138/173 X |
| 4,333,545 | 6/1982 | Roberts | 138/168 X |
| 4,371,578 | 2/1983 | Thompson | 138/168 X |
| 5,454,402 | 10/1995 | Andre et al. | 138/173 X |
| 5,643,467 | 7/1997 | Romanco | |
| 5,723,051 | 3/1998 | Bartelt et al. | |
| 5,783,067 | 7/1998 | Belden | |

OTHER PUBLICATIONS

*Bliss 21–NL Automatic Bodymaker*, Product Brochure, Published by E.W. Bliss Company, p. C–10, Undated.
Photograph of Squeezing Attachment of a Can Bodymaker, Undated.

*Primary Examiner*—Patrick Brinson
*Attorney, Agent, or Firm*—Sampson & Associates

[57] ABSTRACT

A perforated metal center tube is provided for use within an oil, fuel, or hydraulic filter. The tube is fabricated from a perforated metallic sheet formed into a cylinder in which opposite edges thereof are mutually engaged with one another to form a longitudinal multi-layered lockseam. The lockseam is mechanically clinched to inhibit slippage of the mutually engaged edges without the need for welding, soldering or otherwise chemically or adhesively bonding the lockseam. A series of circumferential beads are provided at spaced locations along the length of the tube to provide structural reinforcement. Each bead is formed through lockseam without generating slippage or disengagement of the first and second edges relative to one another. The beads advantageously provide the tube with sufficient structural integrity to withstand typical filtration pressures, with a metallic sheet of relatively thin gauge.

29 Claims, 12 Drawing Sheets

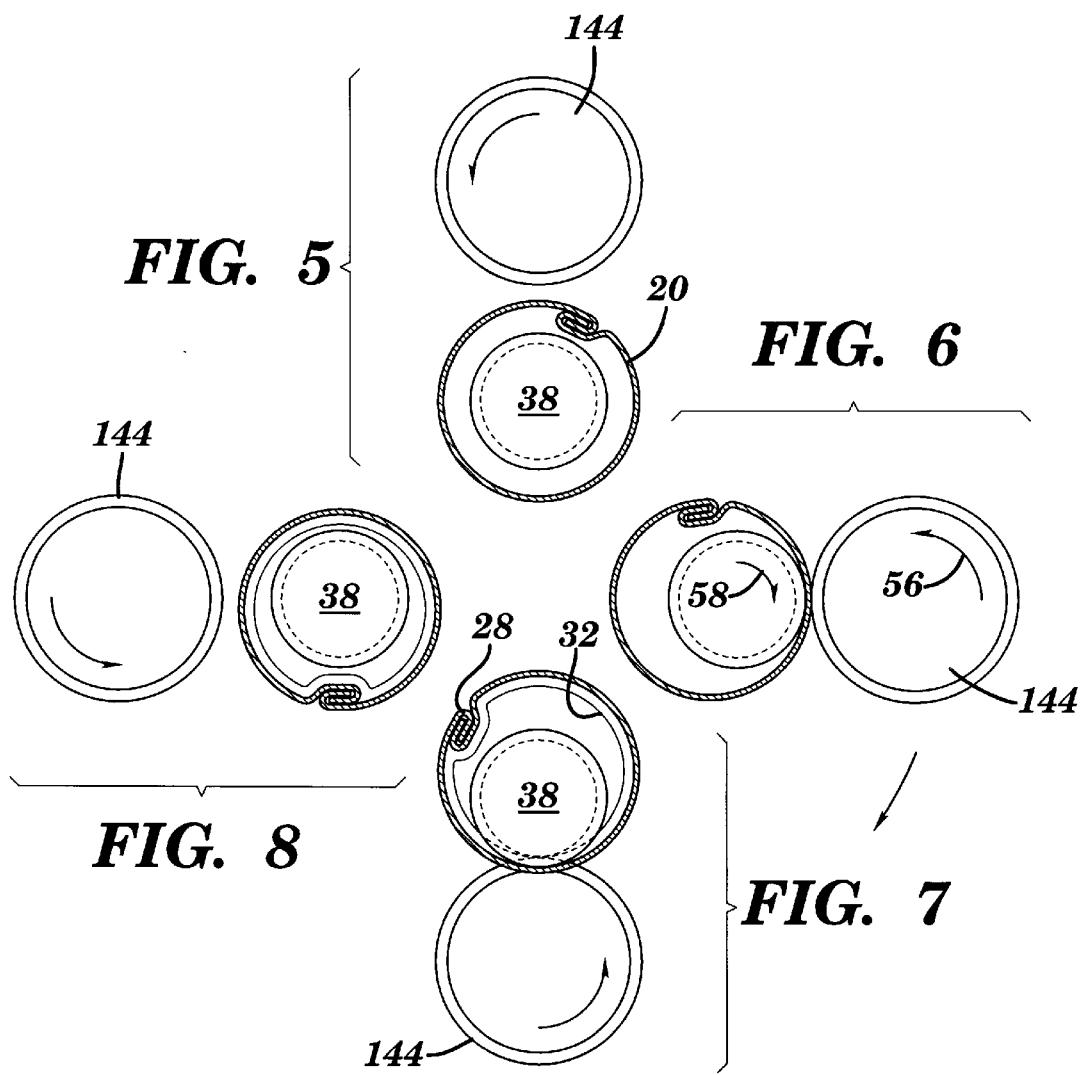

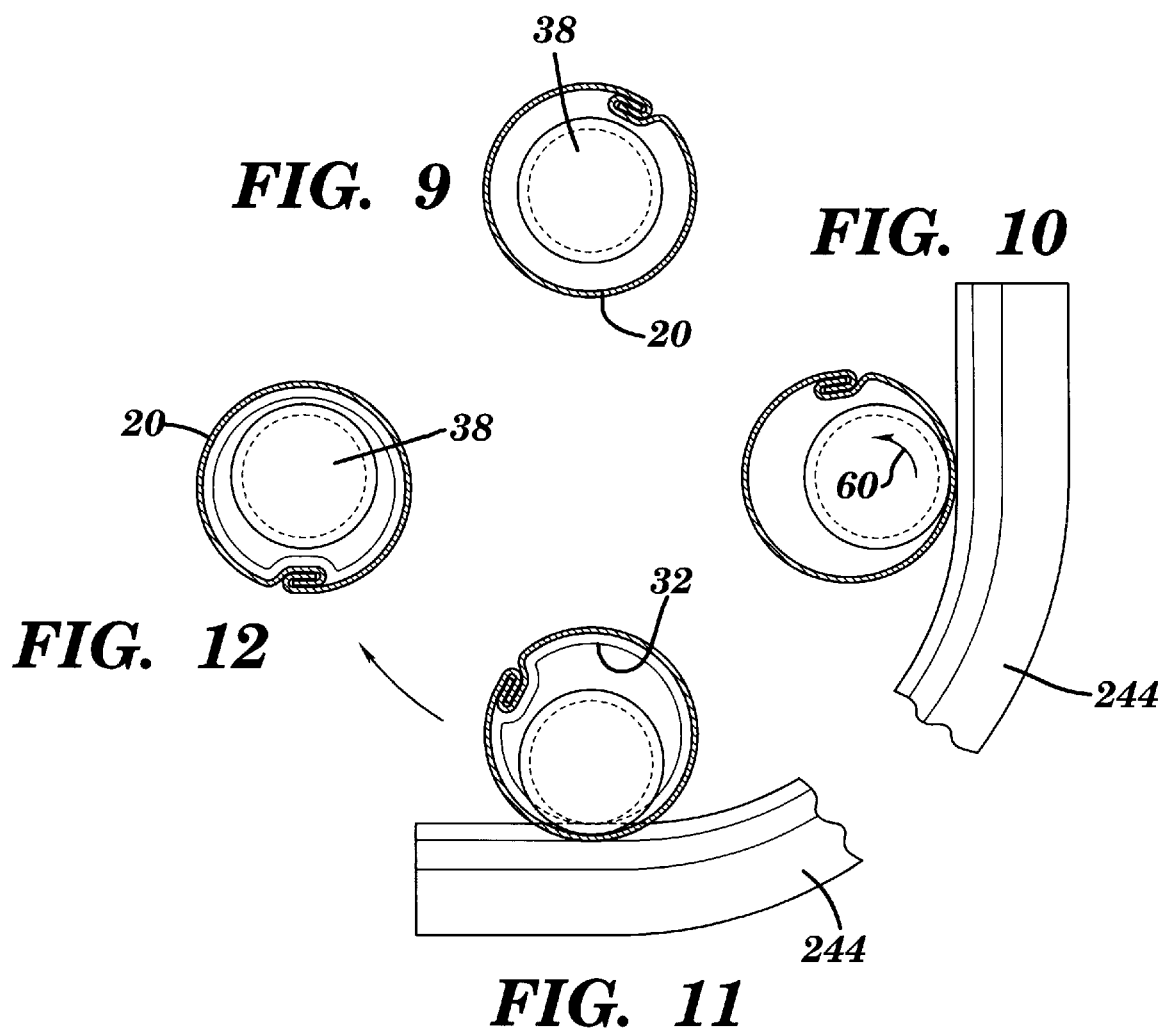

BEADED CENTER TUBE

This application is a continuation of U.S. patent application, Ser. No. 09/038,415, filed Mar. 11, 1998.

BACKGROUND OF THE INVENTION

1. Field of the Invention

This invention relates to perforated filter tubes, and more particularly to a lockseamed center tube having a plurality of circumferential beads.

2. Background Information

A wide variety of perforated tubes for use in fuel, liquid, oil or hydraulic filters have long been known in the art. These tubes are typically fabricated from perforated metallic sheet or coil stock cut to predetermined size, formed into a cylinder and then seamed along adjoining edges. These tubes must have adequate structural integrity to withstand relatively high collapse pressures exerted on the tube by fuel, oil, or hydraulic fluid during conventional filtration operations. The thickness or gauge of the sheet or coil stock and the integrity of seam play important roles in providing the tube with the requisite resistance to the collapse pressures.

One common approach to tube fabrication is to form a cylinder from smooth sheet steel of relatively heavy gauge, and provide a lockseam in which the adjoining edges of the sheet are mechanically folded over one another. The lockseam thus includes several thicknesses of material and is therefore thicker than the remaining circumference of the tube. The resulting center tube advantageously includes a structurally rigid tube wall, with the lockseam being sufficiently rigid for filtration operations without the need for additional welding or brazing operations for savings in labor and capital equipment costs relative to welded seams.

A drawback of this approach, however, is that the relatively heavy gauge sheet stock represents a large percentage of the material expense of the tube. It is thus desirable to utilize lighter gauge sheet stock, while still providing the tube with the requisite structural integrity.

One attempt to overcome this drawback has been to use lighter gauge sheet stock and corrugate it to improve the sheet's structural rigidity. The corrugations are generally applied to the sheet prior to bending into tubular configuration. The corrugations are generally terminated prior to reaching the edges of the sheet, so as not to interfere with fabrication of the lockseam. While corrugations tend to improve the rigidity of the tube, they must be kept sufficiently shallow and curvilinear in profile so as to facilitate tube formation without generating buckling, etc. This aspect thus tends to substantially limit the degree of wall rigidity imparted by such corrugations.

An alternative approach is to apply corrugations after tube fabrication. Such post-fabrication corrugating operations have been utilized in the metal can industry and typically include application of pressure to the wall of a can as it rotates about its axis to provide an indentation about the entire circumference thereof. This approach may enable deeper corrugations for improved strength relative to the aforementioned pre-fabrication corrugations. While this approach may operate successfully for relatively light-duty can making operations, this technique, as well as the conventional equipment utilized for this purpose, has generally been inadequate for use in heavier duty applications such as filter tube fabrication involving simultaneous formation of a plurality of corrugations, or fabrication of deeper, generally rectilinear beads. In these instances, the unsoldered, multi-thickness lockseam of the filter tube tends to disengage or pop open.

One approach to ameliorating this popping, may be to weld or solder the lockseam prior to beading, as has been done in the can making industry. However, welding or soldering represents an additional manufacturing step which tends to add undesirable time and expense to the manufacture of the tube.

This and other techniques utilized in the canning industry are thus generally inapplicable to the filtration industry, due to the disparate structural requirements of these two applications. For example, general purpose metal cans such as those used for packaging food or liquids are typically designed to withstand significantly lower pressures than those experienced by a filter tube of similar size. Moreover, the types of pressures are also distinct. Many metal cans are designed to withstand internal or burst pressures, while filter tubes must withstand external or collapse pressures.

In this regard, corrugations or ribbing applied to general purpose metal cans such as used for food, are typically designed to facilitate handling, i.e. to provide texture to the surface of the can to help prevent slippage, and to help the cans resist becoming dented, etc. Contrariwise, deeper corrugations or beads are desired for filter tubes to add substantial rigidity to enable use of lighter gauge sheet stock.

A need thus exists for a filter center tube and method of fabrication thereof, in which a multi-thickness lockseam is capable of being beaded to enable use of relatively light gauge sheet stock.

SUMMARY OF THE INVENTION

According to a first aspect of this invention, a tube adapted for use in a fluid filter includes a perforated metallic sheet formed so that first and second edges thereof are mutually engaged to form a longitudinal lockseam having a plurality of thicknesses of the metallic sheet and being free from chemical and adhesive bonds. A plurality of circumferential beads are formed at spaced locations along the length of the tube to provide structural reinforcement. Each of the plurality of circumferential beads is extended through the lockseam without disengaging the lockseam.

The present invention provides, in a second aspect, a method for fabricating a tube for use in a fluid filter. The method includes the steps of:

(a) providing a metallic sheet having a pattern of perforations disposed thereon;

(b) forming the metallic sheet wherein first and second edges thereof are disposed proximate one another;

(c) mutually engaging the first and second edges to form a longitudinal lockseam having a plurality of layers of the metallic sheet and being free from chemical and adhesive bonds; and (d) forming a plurality of circumferential beads at spaced locations along the length of the tube to provide structural reinforcement, wherein each of the plurality of circumferential beads is extended through the lockseam substantially without disengaging the lockseam.

The above and other features and advantages of this invention will be more readily apparent from a reading of the following detailed description of various aspects of the invention taken in conjunction with the accompanying drawings.

BRIEF DESCRIPTION OF THE DRAWINGS

FIGS. 5–8 are end views of various steps in one method of fabrication of the filter tube of FIG. 1;

FIGS. 9–12 are end views of various steps in an alternate method of fabrication of the filter tube of FIG. 1;

DETAILED DESCRIPTION OF THE PREFERRED EMBODIMENTS

Figure 1:
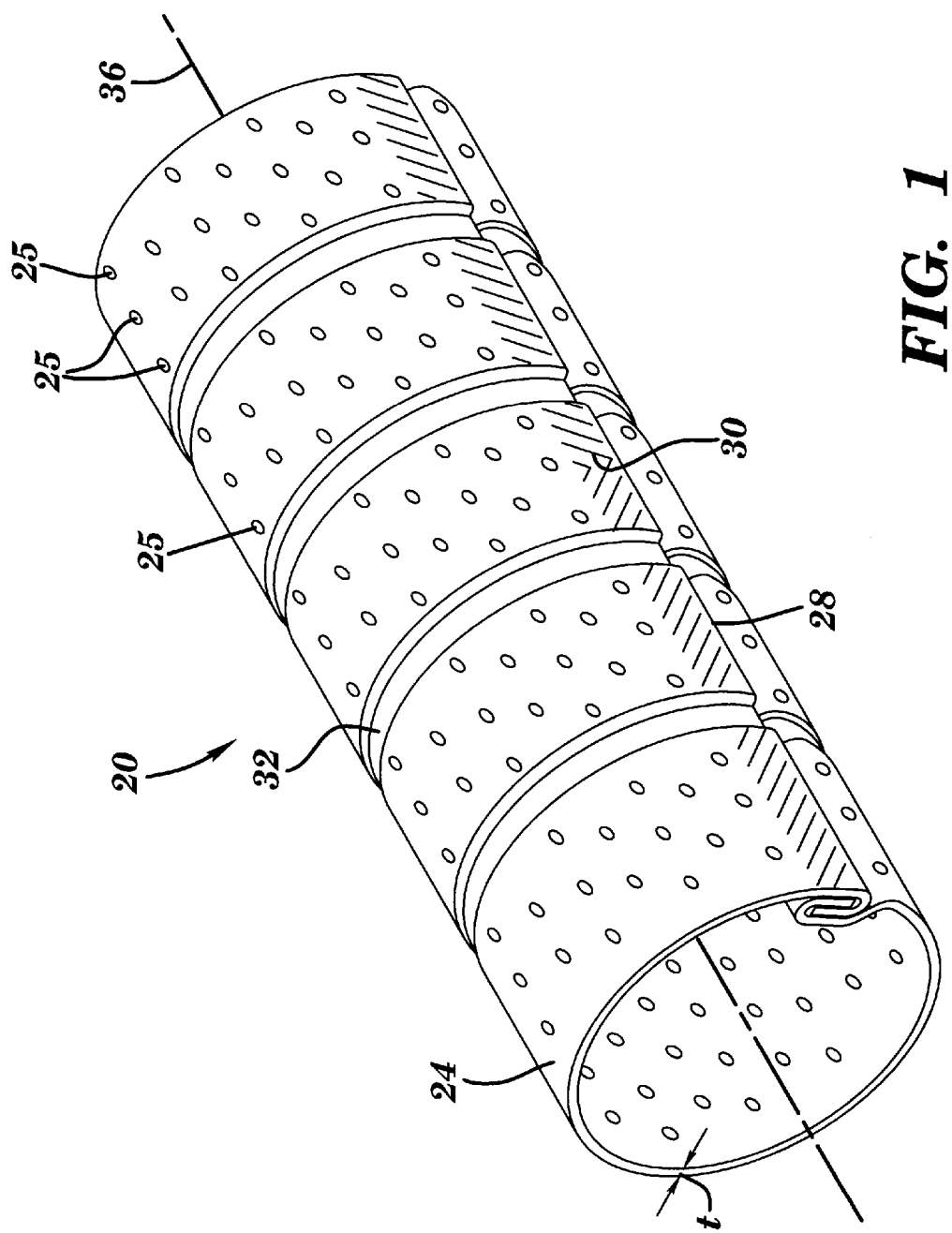
FIG. 1 is a perspective view of a filter tube of the present invention.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Referring to FIG. 1, the subject invention includes a perforated metal center tube 20 for use within an oil, fuel, or hydraulic filter. Tube 20 is fabricated from a perforated metallic blank or sheet 24 formed into a tube or preferably a cylinder, in which opposite edges thereof are mutually engaged with one another to form a longitudinal lockseam 28. Lockseam 28 is formed in a conventional manner in which the edges are folded over one another to provide the seam with a multi-layered thickness in the radial direction. In one embodiment of tube 20 as shown, lockseam 28 includes four thicknesses of sheet 24. Lockseam 28 is mechanically clinched or crimped with a herringbone pattern 30 to help prevent slippage of the mutually engaged edges. Any suitable technique familiar to those skilled in the art may be utilized for this purpose. For example, a conventional crimp die (not shown) may be utilized to apply a predetermined compressive force to the lockseam. In this manner, lockseam 28 provides requisite structural integrity to facilitate formation of beads 32 without the need for welding, soldering or otherwise chemically or adhesively bonding the lockseam, while also eliminating any need for reworking the lockseam after beading. A series of circumferential beads 32 are provided at spaced locations along the length of tube 20 to provide structural reinforcement to the tube. Each bead 32 is formed through lockseam 28 without generating slippage or disengagement of the first and second edges relative to one another. Beads 32, which will be discussed in greater detail hereinafter, advantageously provide tube 20 with sufficient structural integrity to withstand typical filtration pressures, with a metallic sheet 24 of relatively thin gauge or thickness t. The perforation pattern, including diameter of each perforation 25 and spacing therebetween, is predetermined to provide desired fluid flow therethrough while providing the tube with sufficient structural integrity for a given application. Moreover, in one embodiment as shown, the perforation pattern is predetermined so that the beads 32 and lockseam 28 are free from perforations for enhanced strength.

As used herein, the terms "longitudinal" and "axial" shall refer to a direction parallel to central axis 36 of a cylindrical tube of the present invention. Similarly, the term "radial" shall refer to a direction extending orthogonally from the central axis, and the term "circumferential" shall refer to a direction along the circumference or periphery of a cylindrical tube of the present invention.

Figure 2:
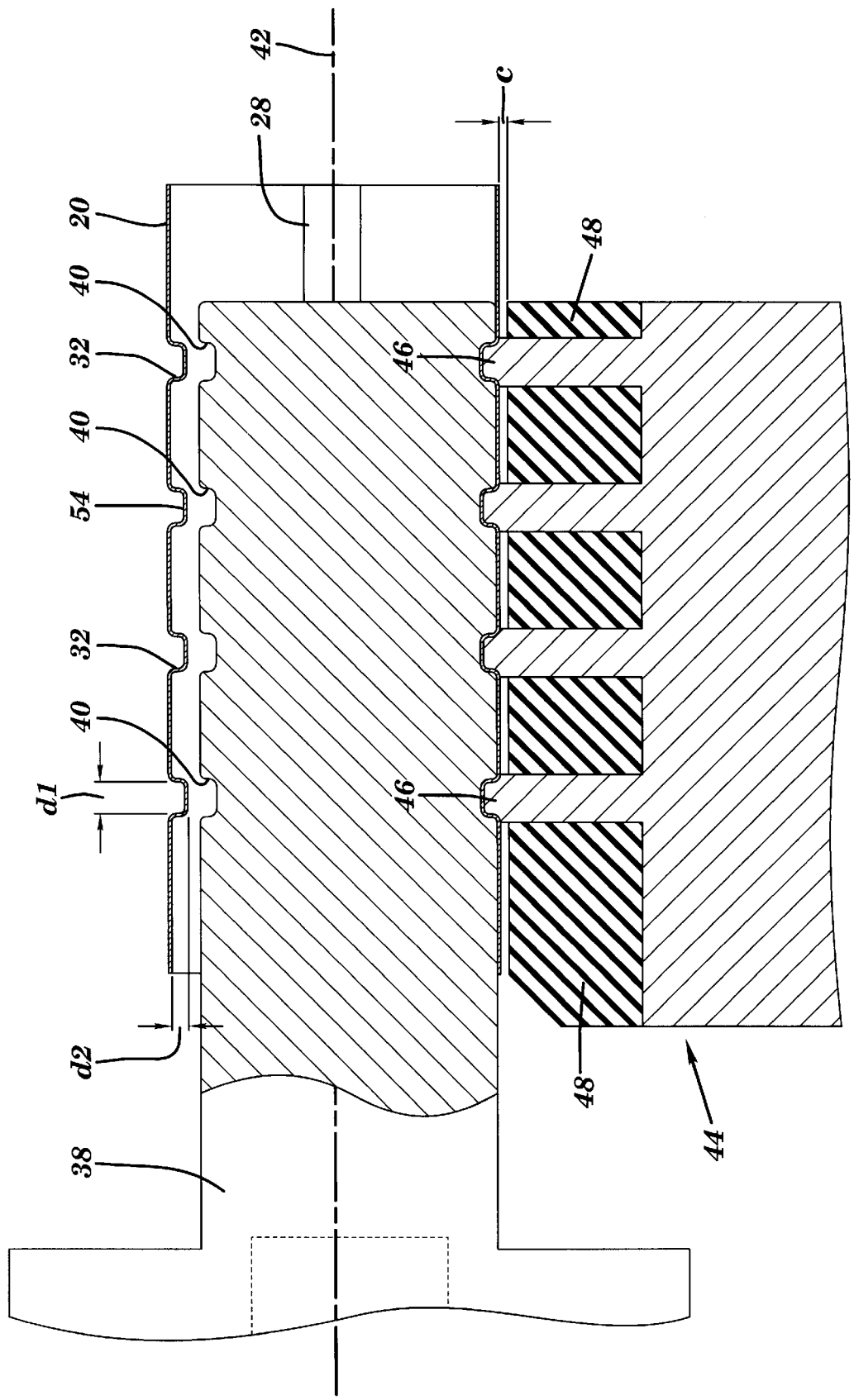
FIG. 2 is a partially cross-sectional plan view of the filter tube of FIG. 1, during a step in the fabrication thereof.

Referring now to FIG. 2, beads 32 are formed in tube 20 by fitting the lockseamed sheet 24 (FIG. 1) over a cylindrical support or mandrel 38 which is provided with a series of annular troughs or grooves 40 sized and shaped to define the beads. Mandrel 38 is adapted to rotate about its central axis 42 which is effectively cammed into mating engagement with a form element 44 having series of projections 46. Projections 46 are sized and shaped for metal forming receipt within troughs 40. Movement of mandrel 38 and element 44 towards one another moves the projections into engagement with portions of sheet 24 and then plastically deforms those portions into respective troughs 40 to form beads 32 as shown. The rotation of mandrel 38 serves to form the beads along the complete circumference of cylindrical sheet 24, including through lockseam 28, to form a completed center tube 20 as best shown in FIG. 1.

Troughs 40 and projections 46 have a substantially rectilinear axial cross-section, which, as shown, forms beads 32 having a similar rectilinear cross-section as defined by bottom portions 54 of substantially flat cross-section and which extend axially a distance d1 approximately greater or equal to the radial depth d2 of the bead. Bottom portion 54 of each bead 32 thus substantially defines a cylindrical surface. This rectilinear profile generally provides tube 20 with greater structural integrity than would conventional corrugations which generally utilize an undulating or sinusoidal axial cross-section.

As also shown, in one embodiment, form element 44 includes a liner 48 disposed between projections 46. Liner 48 may be sized to provide a predetermined clearance c with tube 20 at the nip point or point of closest proximity between element 44 and mandrel 38 when disposed in their fully engaged orientation as shown. Clearance c is predetermined to permit liner 48 to engage and apply pressure to lockseam 28 as the lockseam passes through the nip point. Clearance c enables liner 48 to be fabricated from a relatively rigid material, such as a metallic material formed integrally with mandrel 38.

However, the liner is preferably fabricated from a resilient material such as rubber or polyurethane. In this regard, the durometer hardness of the material is predetermined to apply sufficient pressure to substantially prevent the lockseam from buckling or "popping" or otherwise disengaging during the beading operation. The predetermined durometer hardness also provides sufficient resilience to permit the radial thickness of the lockseam to vary along its length due to the stresses generated by the beading operation. Clearance c is preferably equal to or less than the nominal thickness of sheet 24 multiplied by the number of extra sheet thicknesses (i.e. greater than one sheet, as shown) in lockseam 28. This provides a clearance c between the unseamed portion of tube 20 and liner 48 equal to or less than three times the thickness of sheet 24 as shown. The particular size or magnitude of clearance c, if used at all, is determined in combination with the resiliency or hardness of liner 48. For example, a relatively larger clearance c may be utilized for relatively hard or unresilient liners such as those fabricated from metal or hard rubber or plastic. A smaller clearance c may be utilized with liners having a lower durometer hardness in order to apply the requisite pressure to lockseam 28 during beading operations. In a preferred embodiment, liner 48 is provided with sufficient resiliency to enable clearance c to be substantially eliminated or reduced to zero so that the liner may supportably engage both the seamed and unseamed portions of the tube during the beading operation. Examples of materials suitable for the liner include natural rubber and synthetic rubbers that exhibit good tear and abrasion resistance, while also being resistant to lubricating oils commonly associated with metal fabrication. Examples of synthetic rubbers which may be utilized in the present invention include polyurethanes or other polymers or copolymers including polybutadiene rubbers (BR), polyisoprene rubbers (IR), fluorinated rubbers such as polytetrafluoroethylene (PTFE), polyimide, acrylates, butyl rubber (IIR), chlorosulfonated polyethylene, neoprene, nitrile rubbers (NBRs), thermoplastic rubbers, or blends thereof with or without fillers or substrates. The liner thus permits lockseam 28 to expand radially a predetermined extent on either side and proximate each bead 32, where stress concentrations are relatively high. The liner will tend to prevent expansion of the lockseam at positions further from beads 32 where stresses generated by the beading operation are relatively low. In this manner, liner 48 facilitates the formation of relatively deep rectilinear beads for added tube strength relative to the less stress-inducing undulating pattern of conventional corrugations.

Figure 3:
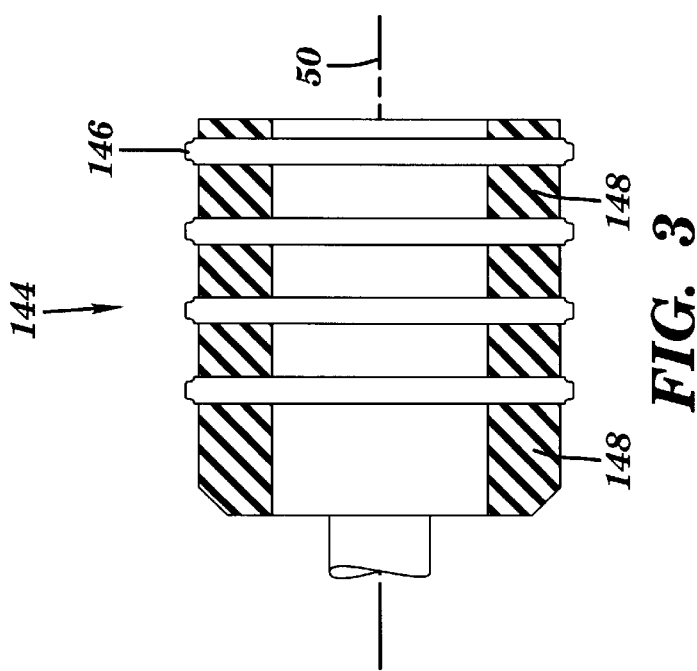
FIG. 3 is a cross-sectional plan view, on a reduced scale, of an embodiment of a form element utilized to fabricate the filter tube of FIGS. 1 and 2.
Figure 14:
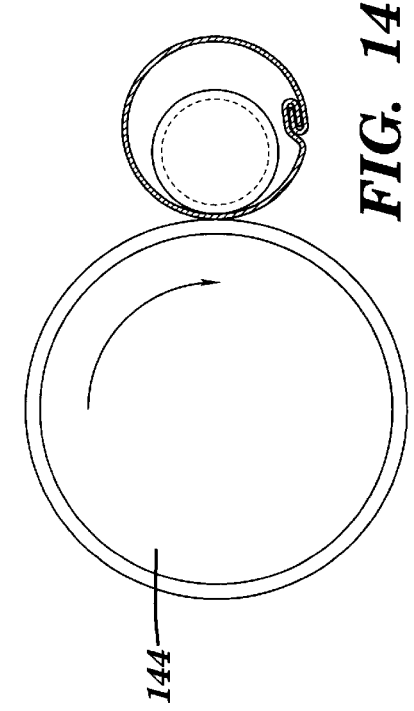
FIGS. 13–16 are end views of various steps in a further method of fabrication of the filter tube of FIG. 1.
Figure 15:
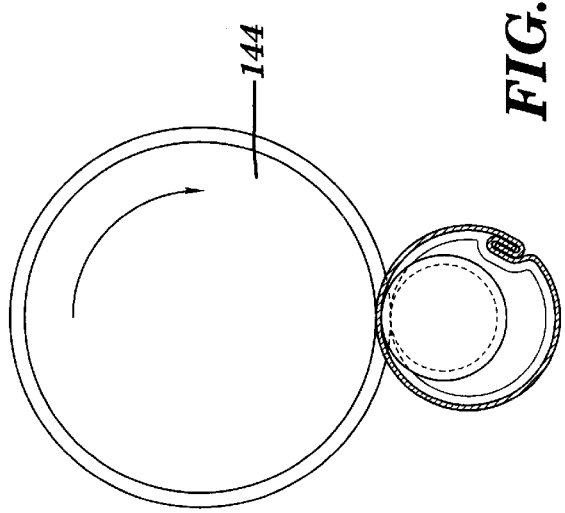
Figure 13:
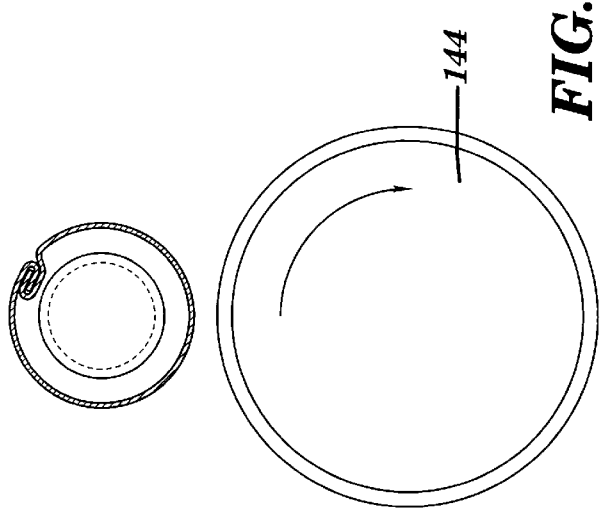
Figure 16:
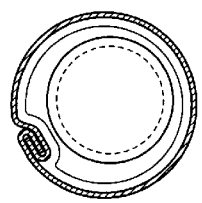

Turning now to FIG. 3, in one embodiment, form element 44 is fabricated as a substantially cylindrical roll 144. The projections include a series of annular rings 146 with a liner 148 disposed therebetween. Roll 50 is adapted to rotate about its longitudinal axis 50 during beading operations as will be discussed hereinbelow.

Figure 4:
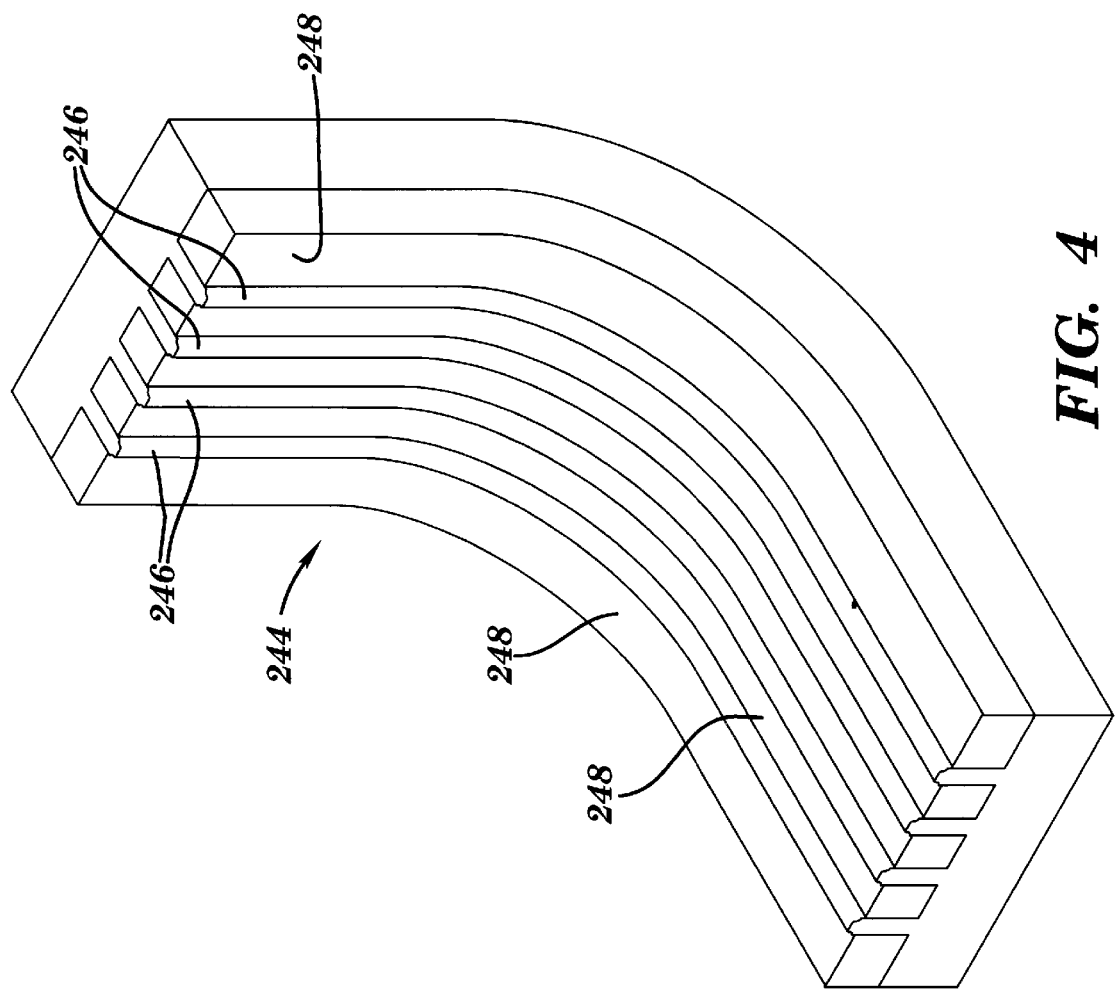
FIG. 4 is a perspective view of an alternate embodiment of a form element utilized to fabricate the filter tube of FIGS. 1 and 2.

A further embodiment of form element 44 is shown as rail 244 in FIG. 4. Rail 244 includes a plurality of elongated projections 246 with liner 248 disposed therebetween.

One embodiment of the beading operation of the present invention utilizes a roll 144 and is shown in FIGS. 5–8. Roll 144 and mandrel 38 may be disposed on any suitable apparatus (not shown) such as a manual or automatic machine of the type commonly utilized for applying corrugations to metallic cans, in which the roll 144 and mandrel 38 travel in a planetary manner relative to one another during operation.

As shown in FIG. 5, the unbeaded tube, including lockseam 28 and herringbone clinch 30, is placed concentrically over mandrel 38 which is disengaged from roll 144. Roll 144 is then rotated on its axis as shown by arrow 56 as the roll is cammed into contact with sheet 24 as shown in FIG. 6. Such contact tends to rotate mandrel 38 and sheet 24 in the direction indicated by arrow 58. Roll 144 and/or roll 58 is gradually cammed into full engagement with mandrel 38 as the rotation of the roll, mandrel and tube forms beads 32 about the complete circumference of the tube, including lockseam 28. Mandrel 38 and roll 144 are subsequently cammed away from one another until fully disengaged as shown in FIG. 8 to permit removal of the beaded tube 20 from mandrel 38.

An alternate method of providing beads 32, utilizing mandrel 38 and rail 244 is shown in FIGS. 9–11. This method is substantially similar to that shown in FIGS. 5–8. In particular, the unbeaded tube is placed over mandrel 38 in the step shown in FIG. 9. The mandrel travels along an arc towards a curved rail 244. The radius of curvature of rail 244 is greater than that of the arc along which the mandrel travels. This movement of the mandrel relative to the rail thus serves to effectively cam mandrel 38 into initial engagement with rail 244 as shown in FIG. 10. Continued movement of mandrel 38 tends to roll the mandrel along curved rail 244 into tighter engagement with the rail until full engagement is reached, as shown in FIG. 11. Further arcuate movement of the mandrel moves it away from the rail to its disengaged position shown in FIG. 12, for removal of the beaded tube 20.

In a still further variation of the beading operation, mandrel 38 may be rotated about a roll 144 that rotates about a stationary axis as shown in FIGS. 13–16. Mandrel moves from a disengaged position (FIG. 13) for tube insertion, to initial engagement (FIG. 14), full engagement (FIG. 15), and to its disengaged position (FIG. 16) for removal of the beaded tube 20.

Figure 17:
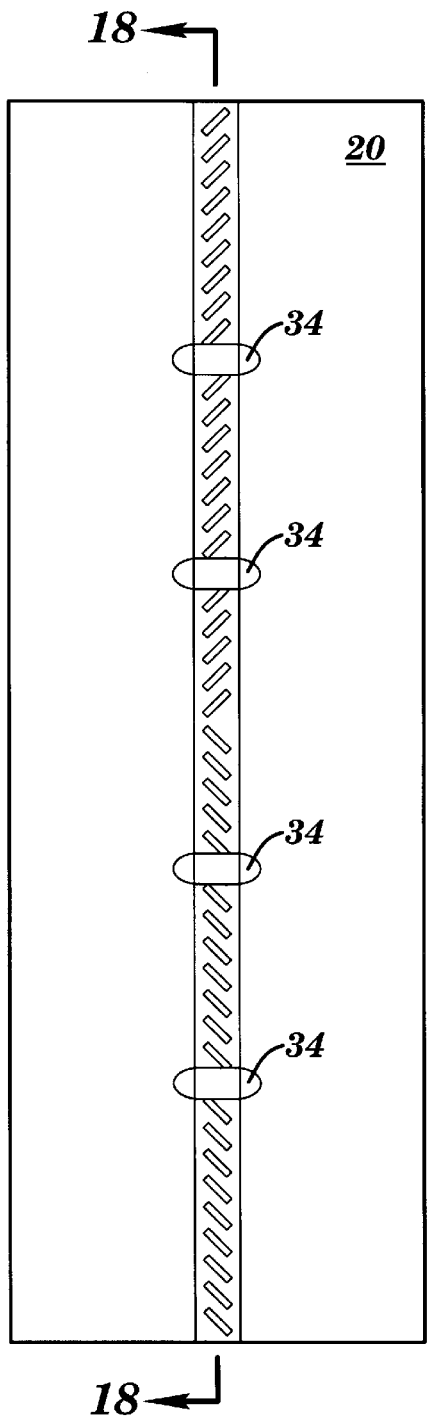
FIG. 17 is a plan view of an optional step in the fabrication of the filter tube of FIG. 1.
Figure 18:
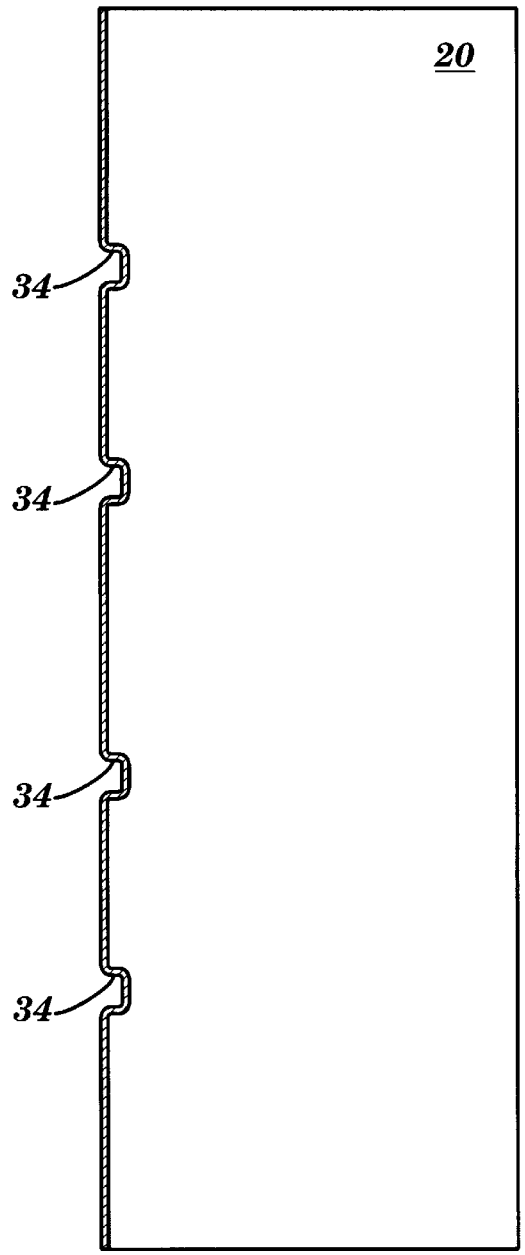
FIG. 18 is a cross-sectional view taken along 18—18 of FIG. 17.

Turning now to FIGS. 17 & 18, it may be desirable to provide tube 20 with a series of indentations or "pre-beads" 34 prior to formation of beads 32 (FIG. 1). This optional step may be particularly useful when beading a tube 20 fabricated from a sheet 24 of relatively large thickness. Conversely, it may be desirable to omit this pre-beading step when beading tubes fabricated from lighter gauge sheet 24. In this optional step, pre-beads 34 are disposed along seam 28 at spaced locations predetermined to align with projections 46 (FIG. 2) during subsequent beading formation. As shown in FIG. 18, the pre-beads are preferably provided with a cross-sectional profile of substantially similar size and shape to that of beads 32 (FIG. 2). In this manner, seam 28 is effectively beaded before the remainder of the tube. When subsequently formed as described hereinabove, beads 32 (FIG. 1) will extend continuously about the circumference of the tube, through pre-beads 34. This pre-beading step substantially eliminates the need to bend the multithickness seam 28 during the aforementioned formation of beads 32 as discussed hereinabove with respect to FIGS. 2–16. This step thus advantageously smooths the transition between the single thickness sheet 24 and the multiple thickness seam 28 for smoother beading operation. Pre-beading seam 28 in this manner also tends to enable formation of beads 32 using relatively less engagement force between projections 46 (FIG. 2) and the tube. Pre-beading thus advantageously tends to reduce stress and wear on the beading apparatus, while it also enables formation of relatively deeper beads 32. Pre-beads 34 may be formed by any convenient method known to those in the metal working field, such as by striking tube 20 with a suitable tool sized and shaped to provide the pre-beads with the desired geometry.

The present invention thus enables center tubes 20 to be fabricated with relatively light gauge metallic sheet while being able to withstand pressures commonly associated with fluid filtration, such as approximately 50–100 psi.

Sheets of substantially any thickness may be utilized. However, thicknesses within a range of approximately 0.007–0.010 in (0.1–0.2 mm) are preferred for tubes of approximately 1.0–2.0 in (25–50 mm) in diameter.

Tube 20 may be fabricated from a wide range of materials, such as, for example, tin plate, cold rolled steel, flashcoated zinc, stainless steel, aluminum, brass and ferrous or non-ferrous alloys. The tube may be provided with any number of sizes, ranging from less than 2 cm in diameter to 25 cm or more. Lengths of the tubes may be anywhere from approximately 2 cm to 130 cm or more.

Tubes 20 constructed in accordance with the present invention have been shown to withstand collapse pressures common to liquid or hydraulic filtration operations without the need for additional operations such as welding, brazing, soldering or post-beading re-work of the lockseam. This result is surprising in light of prior art beaded cans and the like which tended to utilize both solder or braze on the lockseams and shallow undulating corrugations rather than the rectilinear beads of the present invention.

Although tube 20 has been described as being applied to a liquid filter, the tube and fabrication methods of the present invention may be used in various other applications such as air or gas filtration and conventional metal can fabrication.

Although tubes of the present invention have been shown and described herein having circular transverse cross-sections, it should be apparent to those skilled in the art that substantially any cross-sectional geometry may be utilized without departing from the spirit and scope of the present invention.

Figure 19:
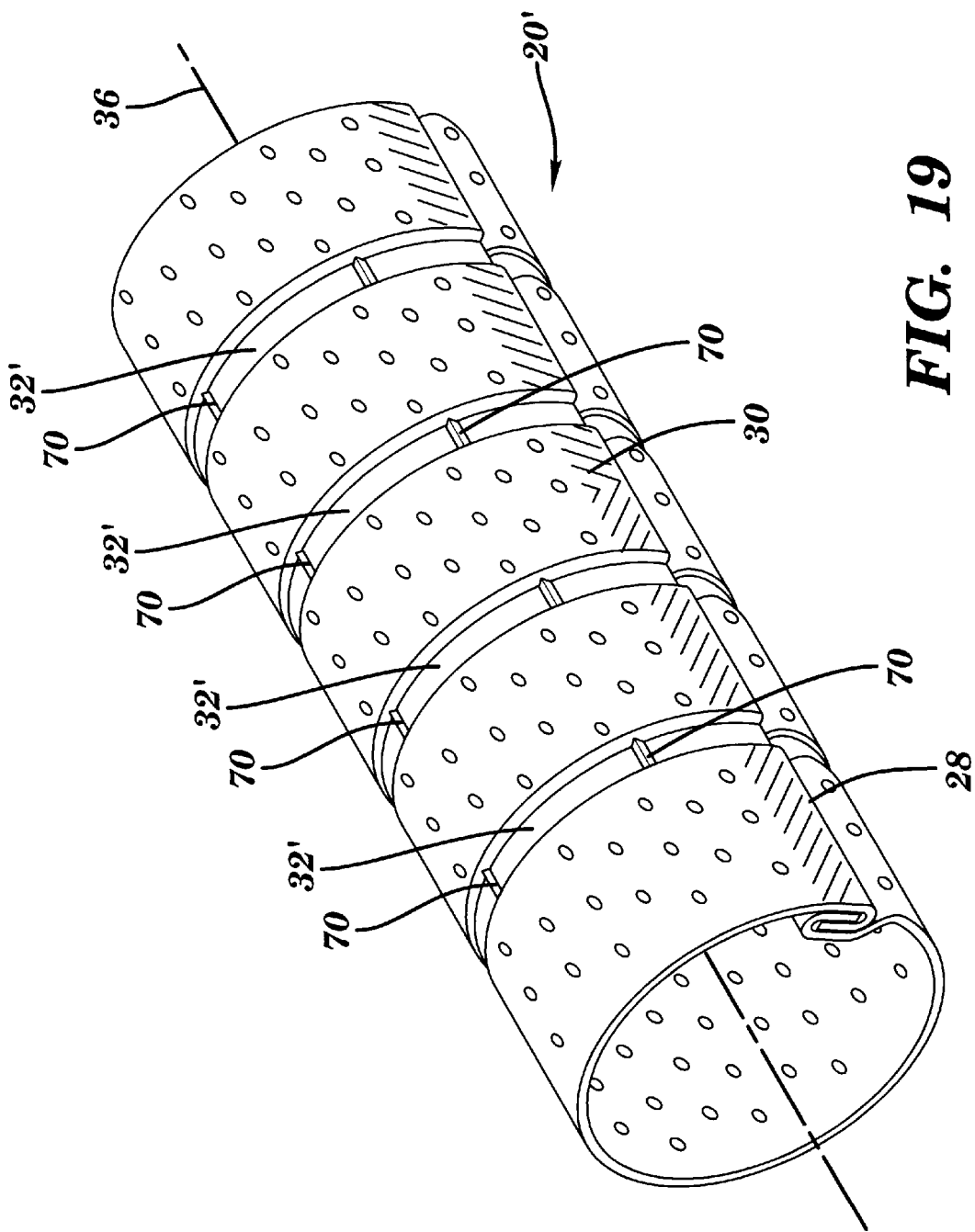
FIG. 19 is a perspective view of an alternate embodiment of a filter tube of the present invention.

A further embodiment of the present invention is shown in FIGS. 19–23. Turning to FIG. 19, a perforated metal center tube 20' is substantially similar to tube 20, though a 'squeezing' method is utilized to fabricate beads 32', as will be described hereinbelow. The resulting beads 32', are provided with pinched portions 70 placed at predetermined, spaced locations along the beads 32' which correspond to the junctions 74 (FIG. 22) of die portions 46' as will also be discussed hereinbelow. Lockseam 28 of tube 20' may be provided with a clinch or crimp, such as the herringbone crimp pattern 30 as shown, or may be optionally fabricated without the crimp.

Figure 20:
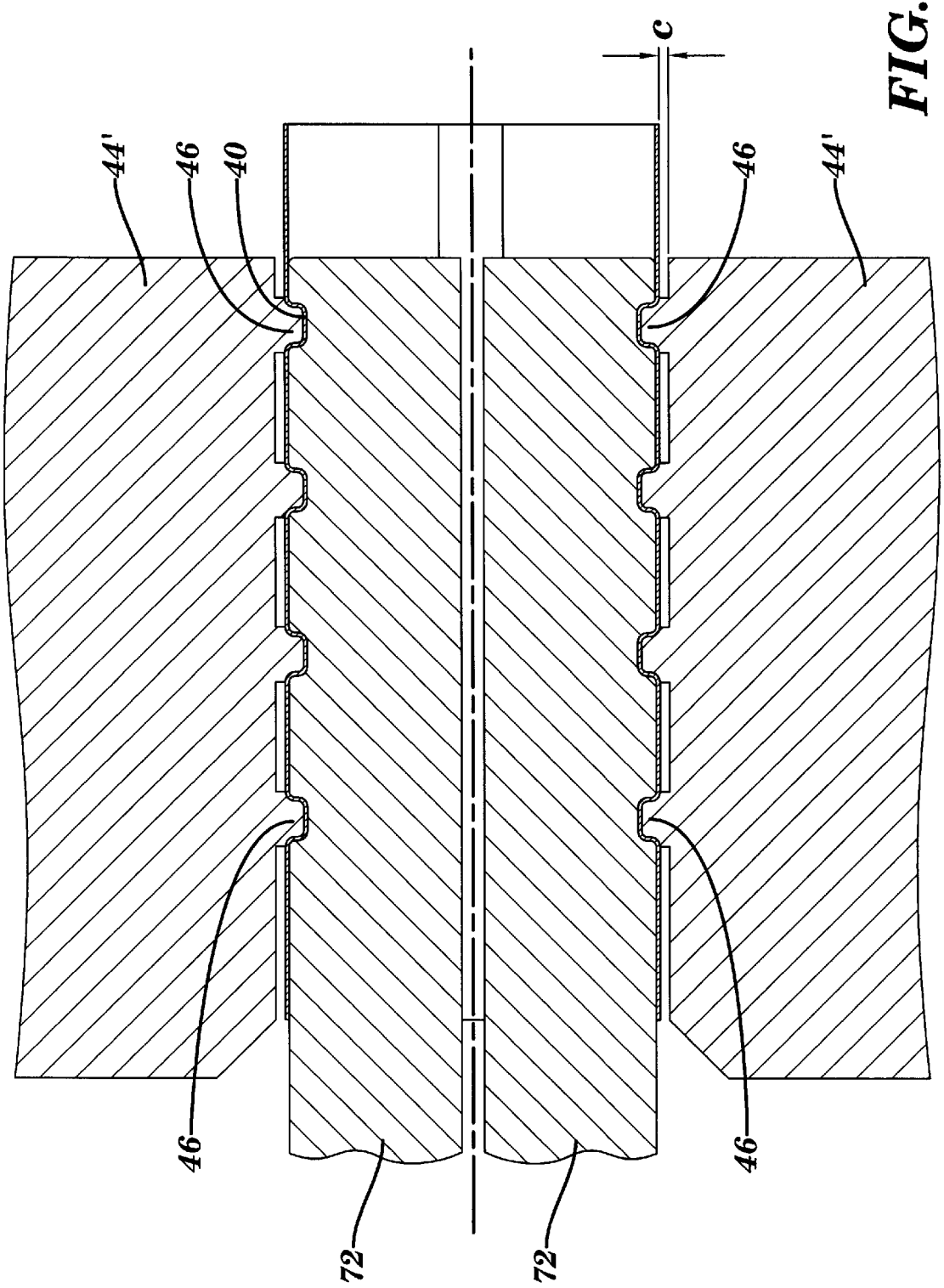
FIG. 20 is a cross-sectional plan view of the filter tube of FIG. 19, taken along 20—20 of FIG. 22, during a step in the fabrication thereof.

Referring to FIG. 20, the beads 32' are formed in tube 20' by fitting the unbeaded tube or tubular sheet 24 concentrically with a series of inner dies 72. Each of the dies 72 are provided with annular troughs or grooves 40 adapted to engage the inner surface of the tube as shown. The inner dies 72 are adapted to move radially outwardly and inwardly to alternately engage and release the tube. A series of form elements 44' are also radially movable to alternately engage and release an exterior surface of the tube, as will be discussed in greater detail hereinbelow. The form elements 44' are provided with a series of projections 46 which are sized and shaped for metal forming receipt within troughs 40. Movement of the inner dies 72 and elements 44' towards one another moves the projections into engagement with portions of sheet 24 and then plastically deforms those portions into respective troughs 40 to form beads 321 as shown.

Each element 44' may be fabricated as a one piece device (as shown), or alternatively, may be provided with a liner 48 fabricated from a polymeric or metallic material as shown and described hereinabove with respect to FIG. 2. Whether or not a discrete liner 48 is utilized, clearance c is provided between the tube and the portion of the elements 44' disposed between the projections 46. The clearance c may be predetermined to permit liner 48 to engage and apply pressure to lockseam 28 as the lockseam passes through the nip point, as discussed hereinabove. Alternatively, forming the beads 32' by this squeezing technique enables the clearance c to be sufficiently large to effectively preclude such engagement of the elements 44' with the lockseam 28. Such lack of contact between projections 46 may be permitted because unlike the sequential bead fabrication techniques described hereinabove with respect to FIG. 2, the inner dies 72 provide simultaneous support to opposite sides of the inner surface of tube 20' during bead formation. This support tends to restrict radial or lateral displacement of the tube during bead formation, to substantially reduce any tendency for the seam to pop or otherwise loosen during bead formation in the lockseam 28. In this manner, rather than proceeding sequentially, the beading of nominally each point or portion along the circumference of the tube is performed simultaneously. Advantageously, this aspect tends to simplify the beading process relative to other approaches.

Figure 21:
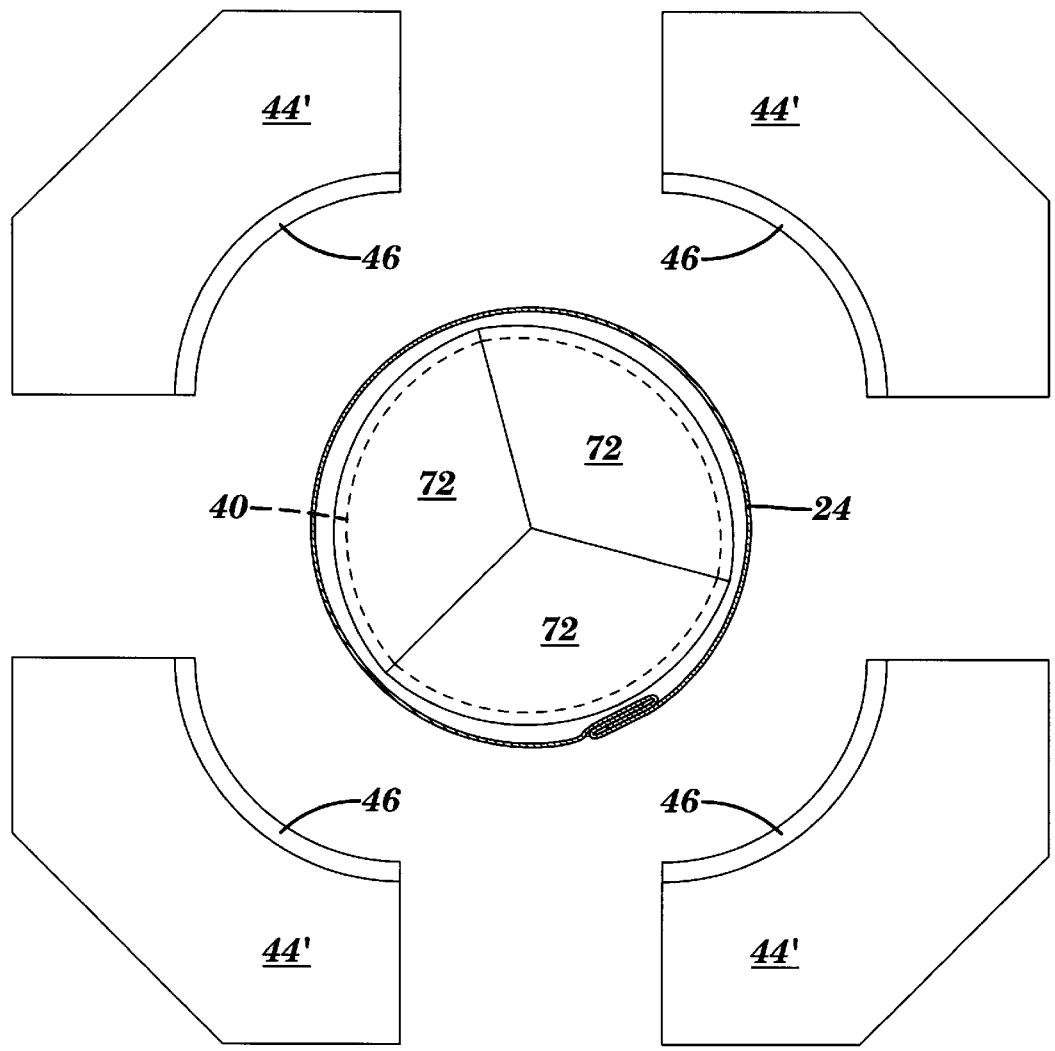
FIGS. 21–23 are schematic end views of various steps in a method of fabrication of the filter tube of FIG. 19.
Figure 22:
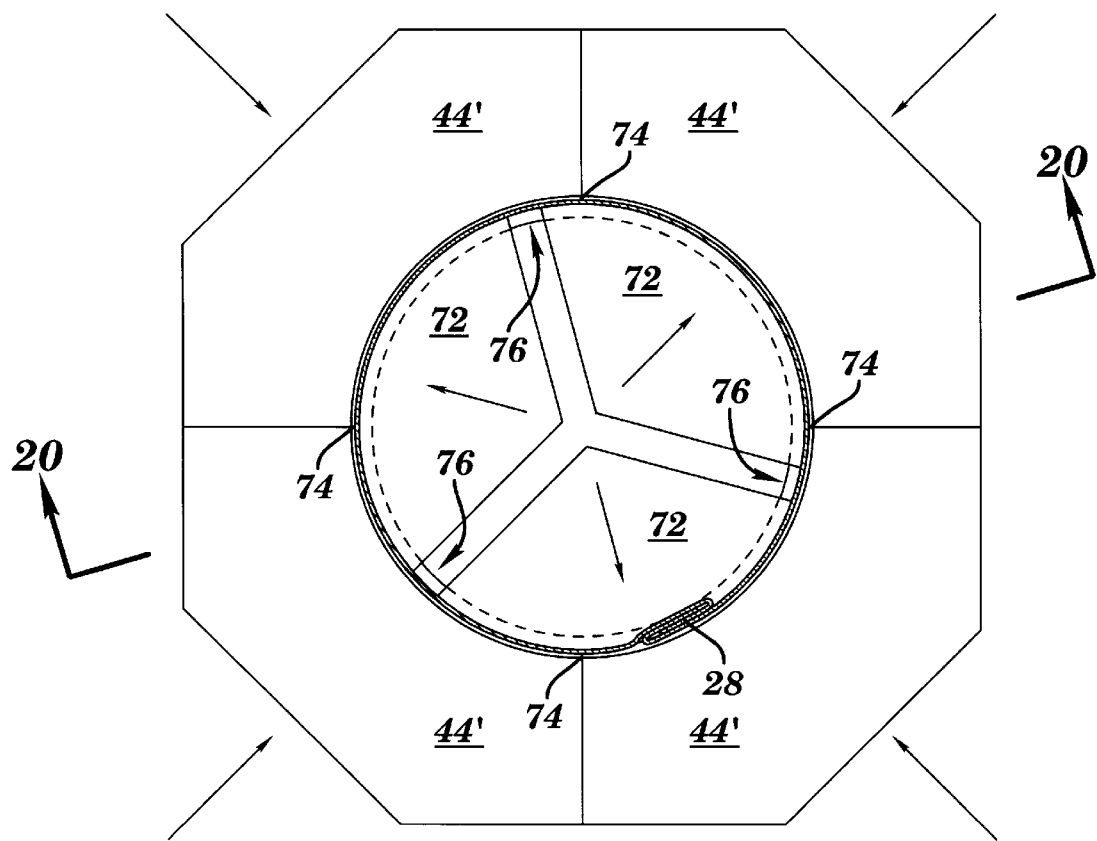
Figure 23:
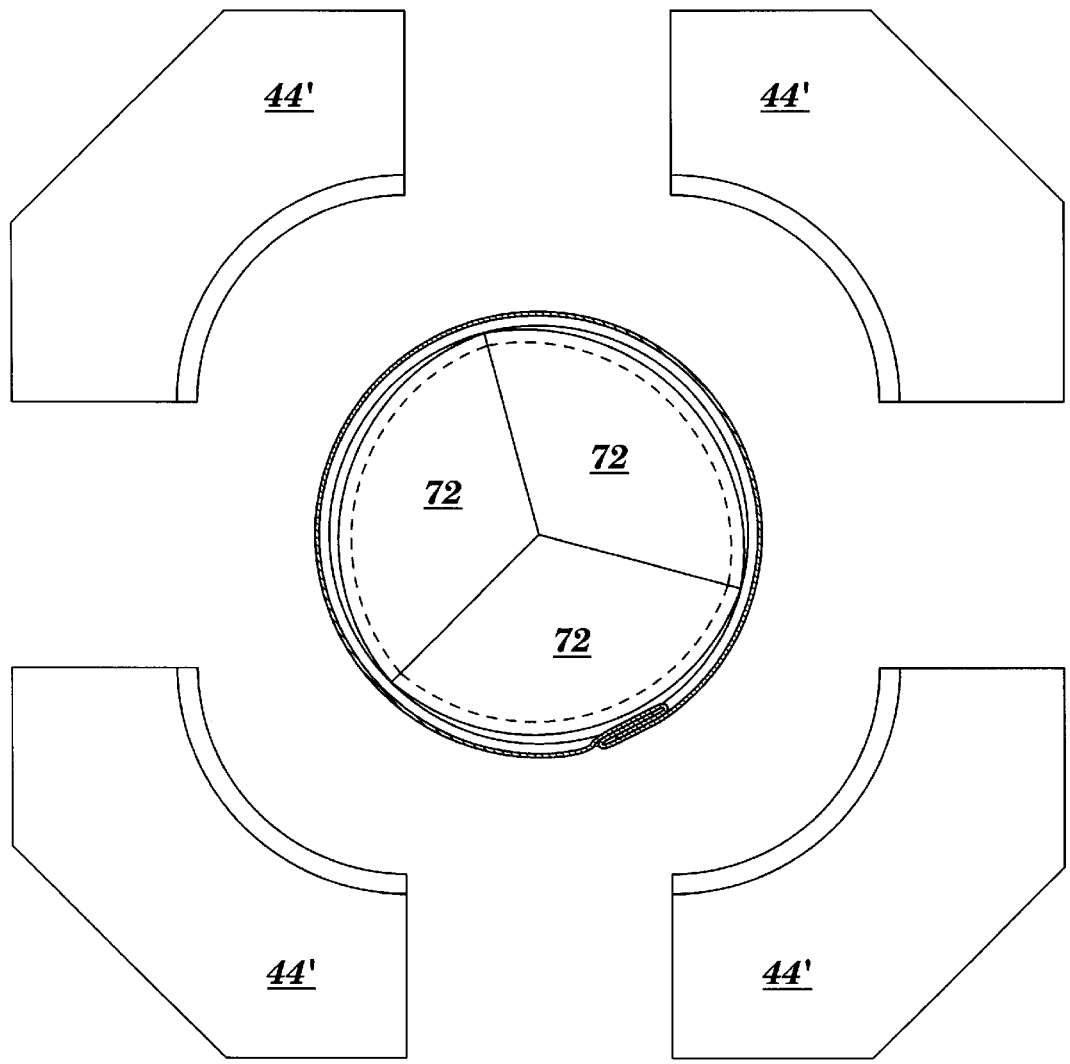

Turning now to FIGS. 21–23, in an initial step of this beading process, the inner dies 72 are retracted to a radially innermost position to provide sufficient clearance for unbeaded cylindrical sheet 24 to be placed concentrically thereover. As also shown, the outer form elements 44' are disposed in radially outermost positions which provide sufficient clearance for the concentric placement of the tubular sheet 24. Turning to FIG. 22, in a subsequent step, dies 72 are moved radially outward into engagement with the inner surface of sheet 24, while elements 44' are moved radially inward whereby the projections 46 effectively squeeze into full engagement with grooves 40 to form the beads 32' (FIGS. 19 and 20).

The pinched portions 70 (FIG. 19) of the beads are formed at the junction 74 of adjacent elements 44', as mentioned hereinabove. In a preferred embodiment, the junctions 74 are circumferentially offset from gaps 76 disposed between inner dies 72 when in their radially outermost position as shown. This offset helps to maintain support on at least one side of the tubular sheet 24 during beading. Also as shown, lockseam 28 is preferably circumferentially offset from both the junctions 74 and gaps 76 during beading, so that a die 72 and an element 44' both engage the lockseam to help ensure adequate support therefor during beading.

As shown, four elements 44' are provided, each of which are provided with a projection 46 sized and shaped to form an approximately 90 degree portion of bead 32'. Similarly, three inner dies 72 are provided, each having a groove 40 sized and shaped to form an approximately 120 degree portion of bead 32'. However, any desired number of inner dies 72 and outer elements 44', being sized and shaped to form any suitable arcuate portions of bead 32', may be utilized.

Turning to FIG. 23, in a further step, dies 72 are moved radially inward and elements 44' are moved radially outward, to clear and release the fully beaded tube 20' to permit the tube to be withdrawn from the dies 72.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A tube adapted for use in a fluid filter, said tube comprising:

a perforated metallic sheet formed so that first and second edges thereof are mutually engaged to form a longitudinal lockseam having a plurality of thicknesses of said metallic sheet and being free from chemical and adhesive bonds;

a plurality of circumferential beads formed at spaced locations along the length of said tube to provide structural reinforcement;

wherein each of said plurality of circumferential beads is extended through said lockseam while substantially maintaining said mutual engagement.

2. The tube of claim 1, wherein said plurality of circumferential beads are formed by the process of:

(a) engaging an exterior surface of the tube simultaneously at a plurality of circumferential locations along at least one of said spaced locations with a plurality of forming element portions each having a projection disposed thereon, the projections being sized and shaped to form a portion of a bead;

(b) applying pressure to an interior surface of the tube simultaneously at a plurality of circumferential locations thereon, wherein the plurality of forming element portions plastically deforms the tube to form the portion of the bead.

3. The tube of claim 2, wherein said engaging step (a) further comprises the step of engaging the exterior surface of the tube simultaneously at a plurality of locations spaced about the entire circumference of the tube with the plurality of forming element portions.

4. The tube of claim 3, wherein said applying step (b) further comprises applying pressure to the interior surface of the tube simultaneously at locations spaced along substantially the entire circumference thereof, wherein each circumferential portion of the bead is formed simultaneously.

5. The tube of claim 2, wherein said applying step (b) further comprises applying pressure to the interior surface of the tube simultaneously at locations spaced along the circumference thereof.

6. The tube of claim 5, wherein the tube is adapted for being disposed concentrically with a series of inner die portions each having an annular trough adapted to engage the inner surface of the tube, the inner die portions being adapted to alternately move radially outwardly and inwardly to respectively engage and release the tube.

7. The tube of claim 1, further comprising the step of providing an indentation in said longitudinal lockseam at least one of said spaced locations prior to formation of said plurality of circumferential beads.

8. The tube of claim 1, wherein said longitudinal lockseam is mechanically clinched to inhibit release of said mutually engaged edges during beading, said mechanical clinching comprising the step of providing said longitudinal lockseam with a pattern of indentations along the length thereof.

9. The tube as set forth in claim 1, wherein said tube is substantially cylindrical and each of said plurality of circumferential beads comprises a substantially cylindrical surface disposed concentrically with said tube.

10. The tube as set forth in claim 9, wherein each of said plurality of circumferential beads is substantially rectilinear in an axial cross-section.

11. The tube as set forth in claim 1, wherein said longitudinal lockseam comprises at least four thicknesses of said sheet.

12. The tube as set forth in claim 1, wherein said beads are free from perforations.

13. A method for fabricating a tube for use in a fluid filter, said method comprising the steps of:

(a) providing a metallic sheet having a pattern of perforations disposed thereon;

(b) forming the metallic sheet wherein first and second edges thereof are disposed proximate one another;

(c) mutually engaging the first and second edges to form a longitudinal lockseam having a plurality of layers of said metallic sheet and being free from chemical and adhesive bonds;

(d) forming a plurality of circumferential beads at spaced locations along the length of said tube, wherein each of the plurality of circumferential beads is extended through said lockseam while substantially maintaining said mutual engagement of said first and second edges.

14. The method of claim 13, further comprising the step of (e) clinching said longitudinal lockseam prior to said forming step (d), to inhibit movement of said mutually engaged edges relative to one another.

15. The method as set forth in claim 13, wherein said forming step (d) further comprises the steps of:

(f) engaging the tube with a forming element having at least one projection disposed thereon, said at least one projection being sized and shaped to form a portion of a bead;

(g) applying pressure between the tube and the forming element, wherein the forming element plastically deforms the tube to form the bead;

(h) simultaneously engaging the forming element with locations spaced about the entire circumference of the tube to form at least one of the plurality of circumferential beads.

16. The method of claim 15, wherein the forming element comprises a plurality of discrete element portions disposed in spaced relation about the circumference of the tube, each said element portion being movable radially inwardly and outwardly to selectively engage and release the tube.

17. The method as set forth in claim 16, wherein the forming element further comprises a liner adapted to engage the lockseam proximate the projection during beading of the lockseam.

18. The method as set forth in claim 16, wherein said engaging step (h) further comprises the steps of:

engaging an interior surface of the tube with a die, the die having at least one receptacle adapted to receive the at least one projection therein.

19. The method as set forth in claim 18, wherein the die further comprises a plurality of die portions adapted for engagement with the tube at locations circumferentially spaced along an interior surface thereof.

20. The method of claim 19, wherein the plurality of die portions are disposed at spaced locations along the entire internal circumference thereof.

21. The method of claim 19, wherein said plurality of die portions are movable radially inwardly and outwardly to alternately release and engage the tube.

22. The method as set forth in claim 13, wherein the metallic sheet is free from perforations at predetermined areas so that the beads are free from perforations.

23. The method as set forth in claim 14, wherein said clinching step (e) further comprises providing the longitudinal lockseam with a pattern of indentations along the length thereof.

24. The method as set forth in claim 13, wherein said forming step (d) further comprises providing at least one of the plurality of circumferential beads with a surface having a substantially straight axial cross-section.

25. The method as set forth in claim 24, wherein the surface is substantially cylindrical.

26. The method as set forth in claim 13, wherein said forming step (d) further comprises providing at least one of the plurality of circumferential beads with a substantially rectilinear axial cross-section.

27. The method as set forth in claim 13, wherein said longitudinal lockseam comprises at least four thicknesses of said sheet material.

28. The method as set forth in claim 15, wherein said forming step (d) further comprises the step of:
  (i) providing an indentation in said longitudinal lockseam at least one of said spaced locations prior to said engaging step (f).

29. A method for fabricating a filter tube adapted for use in a fluid filter, said method comprising the steps of:
  (a) providing a metallic sheet having a pattern of perforations disposed thereon;
  (b) bending the metallic sheet wherein first and second edges thereof are disposed proximate one another to form a tube;
  (c) mutually engaging the first and second edges to form a longitudinal lockseam having a plurality of layers of said metallic sheet and being free from chemical and adhesive bonds;
  (d) forming a plurality of circumferential beads at spaced locations by engaging the sheet between an internal die and a forming element, the forming element having at least one projection sized and shaped for metal forming receipt by the internal die to form the bead, the forming element having a plurality of element portions disposed at spaced locations along the circumference of the tube and adapted for radial movement to selectively engage and release the tube, the internal die having a plurality of die portions disposed at spaced locations along the internal circumference of the tube and adapted for radial movement to selectively engage and release the tube;
  (e) moving the element portions and the die portions into mutual engagement with the tube to apply pressure to the tube, wherein the tube is plastically deformed to form the bead, the bead extending through said lockseam about substantially the entire circumference of the tube.

* * * * *